United States Patent Office 2,721,192
Patented Oct. 18, 1955

2,721,192

AMINOALKYL-ISOBORNYL ETHER SALTS OF PENICILLIN

Joseph T. Alberi, Jamesville, and William B. Wheatley, Syracuse, N. Y., assignors to Bristol Laboratories Inc., Syracuse, N. Y., a corporation of New York No Drawing. Application January 25, 1952,
Serial No. 268,344

4 Claims. (Cl. 260—239.1)

This invention relates to penicillin salts of certain basic ethers. More particularly, this invention relates to penicillin salts of basic ethers containing the isobornoxy group, and to methods for the preparation of such penicillin salts.

The basic ethers which have been found to form crystalline penicillin salts may be represented by the following general formula:

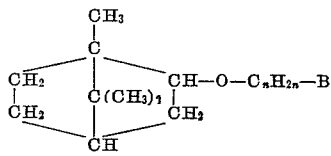

wherein B represents members of the class consisting of piperidino, morpholino, pipecolino, pyrrolidino, N'-alkylpiperazino and —NR₁R₂, wherein R₁ and R₂ are members of the class consisting of hydrogen and lower alkyl, and $C_nH_{2n}$ represents an alkylene radical which may be straight or branched and $n$ represents an integer from 2 to 5 inclusive.

The purpose of this invention is to provide amine salts of penicillin G which are readily prepared, inexpensive, relatively stable and of low water solubility, and at the same time which retain the powerful antibiotic properties of the penicillins. Such penicillin salts are particularly useful in the formulation of various therapeutic compositions containing penicillin, such as tablets for oral use, tooth powders and pastes, dusting powders, ointments, and impregnated bandages for treatment of surface wounds. These penicillin salts are useful also for the preparation of products for use in veterinary medicine and for addition to poultry and livestock feeds.

Numerous amine salts of penicillin G have been prepared, but usually suffer from one or more disadvantages, such as high cost, high water solubility, low stability towards heat or moisture. The penicillin G salts of the basic ethers of this invention are particularly valuable because of their low cost, low water solubility and relativly high stability. For example, the water solubility of the 2-amino-2-methylpropyl isobornyl ether salt of penicillin G is only 3400 Oxford units per milliliter.

The penicillin G basic ether salt of this invention may be prepared by treatment of an aqueous solution of an alkali salt of penicillin G with an appreciably water soluble organic or inorganic salt of the basic ether. For example, the reaction of sodium penicillin G and the basically substituted isobornyl ether hydrochloride in aqueous solution yields the corresponding penicillin G salt of the basically substituted isobornyl ether. Alternatively, the penicillin G basic ether salt may be prepared by the reaction of penicillin G acid and the free basic ether in a water-immiscible organic solvent. Suitable solvents include ethyl ether, isopropyl ether, chloroform, ethylene chloride, methylene chloride, benzene, amyl acetate, methyl amyl acetate, methyl isobutyl ketone, mesityl oxide, n-butanol, and tributyl phosphate.

The basic ethers which we used for the preparation of the penicillin G salts may be prepared by a number of methods, several of which are described below. Isobornyl β-alkylamino-ethyl ethers and isobornyl β-dialkylaminoethyl ethers may be prepared by causing a primary or secondary amine to react with isobornyl β-chloroethyl ether according to the method described in the copending application of Wheatley, Serial No. 180,097, now abandoned. The intermediate isobornyl β-chloroethyl ethers may be obtained by the reaction of camphene and ethylene chlorohydrin according to the method described by Sheffield in U. S. Patent 2,251,214. Isobornyl dialkylaminoalkyl ethers may be prepared by the reaction of sodium isobornoxide and a dialkylaminoethyl halide as described in the aforementioned application, U. S. Serial No. 180,097. 2-amino-2-methylpropyl isobornyl ether may be obtained by the reduction of 2-nitro-2-methylpropyl isobornyl ether by known methods suitable for the reduction of alkyl nitro to amino groups, e. g. catalytic hydrogenation, lithium aluminum hydride. The preparation of 2-nitro-2-methylpropyl isobornyl ether is described by Cox in U. S. Patent 2,417,455.

The following examples are given to illustrate this invention but are not intended to limit it thereto.

EXAMPLE 1

*2-amino-2-methylpropyl isobornyl ether penicillin G salt*

To a mixture of 5 ml. of 2-amino-2-methylpropyl isobornyl ether and 5 ml. of water is added enough hydrochloric acid to bring the pH down to 4.3. This solution is then added to a solution of 400 mg. of sodium penicillin G in 5 ml. of water. An oil separates, which crystallizes on scratching. After thorough chilling, the solid material is collected by filtration and dried in a desiccator. The 2-amino-2-methylpropyl isobornyl ether penicillin salt assays 864 units per milligram. Its water solubility is 3,400 units per milliliter.

EXAMPLE 2

*β-(1-piperidyl)ethyl isobornyl ether penicillin G salt*

A solution of 4.4 grams of potassium penicillin G in 20 ml. of water is added to a solution of 3.55 grams of β-(1-piperidyl)ethyl isobornyl ether hydrochloride in 25 ml. of water. An oil separates, which crystallizes on seeding. After chilling, the crystalline salt is collected by filtration and dried in vacuo. There is obtained the β-(1-piperidyl)ethyl isobornyl ether penicillin G salt, which assays 641 units per milligram. Its water solubility is 4,490 units per milliliter.

The same salt may be prepared by the reaction of an ether solution of β-(1-piperidyl)ethyl isobornyl ether (obtained from 0.69 gram of the hydrochloride) and a solution of one gram of penicillin G acid in ether and acetone. The salt crystallizes out on chilling.

EXAMPLE 3

*β-(4-morpholinyl)ethyl isobornyl ether penicillin G salt*

A solution of 6.42 grams of potassium penicillin G in 20 ml. of water is added to a solution of 5.2 grams of β-(4-morpholinyl)ethyl isobornyl ether hydrochloride in 20 ml. of water. Seeding and scratching induce crystallization. After chilling, the crystalline salt is collected by filtration and dried in vacuo. The β-(4-morpholinyl)ethyl isobornyl ether penicillin G salt thus obtained assays 787 units per milligram. Its water solubility is 7,360 units per milliliter.

This salt may also be prepared by the reaction of an ether solution of β-(4-morpholinyl)ethyl isobornyl ether (obtained from 0.69 gram of the hydrochloride) and a solution of one gram of penicillin G acid in ether and acetone. The salt crystallizes out of the solution on chilling.

While the present invention has been described with particular reference to these aminoalkyl isobornyl ether salts of penicillin G, it will be understood that the aminoalkyl isobornyl ether salts of other penicillins are also included within the scope of this invention. For instance, penicillins such as penicillin G, F, X, O, dihydro F, and K, and mixtures of two or more such penicillins particularly mixtures containing at least 85% penicillin G, are included within the scope of the present invention.

Also, other salts of the aminoalkyl isobornyl ether than the hydrochloride may be employed. Examples of such salts are the phosphate, nitrate, hydrobromide, sulfate, sitrate, and tartrate. In general, any organic solvent-soluble or water-soluble salt may be employed.

Many of these aminoalkyl isobornyl ethers occur in four isomeric forms, that is, as dextro and levo forms of the two diastereoisomers, and as mixtures thereof. It will be understood that penicillin salts of each of these forms, and of mixtures thereof, are included within the scope of this invention.

As will be understood by those skilled in the art, various modifications of the present invention may be performed without departure from the spirit of the invention as defined in the appended claims.

We claim:
1. A salt of penicillin and the free base of formula

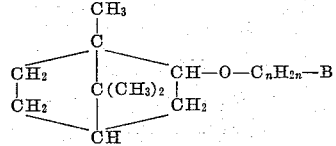

wherein B represents a member selected from the group consisting of piperidino, morpholino, and —$NH_2$; $C_nH_{2n}$ represents an alkylene radical bonded to O and B through different carbon atoms and $n$ represents an integer from 2 to 4 inclusive.

2. A salt of penicillin G and 2-amino-2-methylpropyl isobornyl ether.

3. A salt of penicillin G and β-(1-piperidyl)ethyl isobornyl ether.

4. A salt of penicillin G and β-(4-morpholinyl)ethyl isobornyl ether.

References Cited in the file of this patent

UNITED STATES PATENTS

| | | |
|---|---|---|
| 2,483,381 | Goldberg | Sept. 27, 1949 |
| 2,578,537 | Granatek | Dec. 11, 1951 |
| 2,578,641 | Cooper | Dec. 11, 1951 |